United States Patent [19]
Irving

[11] Patent Number: 5,553,409
[45] Date of Patent: Sep. 10, 1996

[54] SHROUD ANCHOR SYSTEM

[75] Inventor: Harry F. Irving, Calgary, Canada

[73] Assignee: Foothills Steel Foundry Ltd., Canada

[21] Appl. No.: 517,979

[22] Filed: Aug. 22, 1995

[51] Int. Cl.$^6$ .............................. E02F 3/36; A01B 15/00
[52] U.S. Cl. ........................... 37/446; 37/451; 172/719
[58] Field of Search .......................... 37/448, 449, 446, 37/450, 451, 452, 453, 456, 455, 457; 172/701.2, 701.3, 713, 719, 772, 772.5; 299/108, 109

[56] References Cited

U.S. PATENT DOCUMENTS

| | | | |
|---|---|---|---|
| 4,127,952 | 12/1978 | Chamberlain | 37/450 |
| 4,238,896 | 12/1980 | Lanz et al. | |
| 4,625,437 | 12/1986 | Curtis et al. | |
| 4,729,180 | 3/1988 | Hendricks | 37/450 |
| 4,748,754 | 6/1988 | Schwappach | |
| 5,016,365 | 5/1991 | Robinson | |
| 5,088,214 | 2/1992 | Jones | |
| 5,224,282 | 7/1993 | Swick | 37/453 |
| 5,412,885 | 5/1995 | Cornelius | 37/450 X |

FOREIGN PATENT DOCUMENTS

| | | |
|---|---|---|
| 2036118 | 2/1991 | Canada |
| 2129004 | 2/1993 | Canada |

*Primary Examiner*—Terry Lee Melius
*Assistant Examiner*—Robert Pezzuto
*Attorney, Agent, or Firm*—Barnes & Thornburg

[57] ABSTRACT

A wear protector system for shielding the leading edge of an earthmoving implement such as a loading bucket includes an arrangement of shrouds which cover the leading edge between the laterally spaced digger teeth. Each shroud has a nose portion that wraps around the leading edge and a rearwardly extending tail portion having an abutment surface that engages an undercut abutment surface of an anchor block that is welded to the bucket. The complementary abutment surfaces retain the tail portion from moving upwardly away from the bucket surface, whereas the shroud is retained from movement forwardly out of engagement with the lip by use of a cotter pin extending transversely through a passage that is formed partially in the tail of the shroud and partially in the anchor.

10 Claims, 2 Drawing Sheets

5,553,409

SHROUD ANCHOR SYSTEM

BACKGROUND OF THE INVENTION a) Field of the Invention

This invention relates to a new or improved wear protector system, and in particular to a replaceable assembly for protecting from wear the leading edge of an earthmoving implement such as a drag line bucket, a face shovel, buckets for front-end loaders, excavators and the like.

b) Description of the Prior Art

It has long been recognized that measures must be taken to protect the leading edge of earthmoving implements against wear. Typically these leading edges include a series of laterally spaced hardened digging teeth, and the sections of the leading edge between these teeth, if not protected are subject to rapid wear as a result of the abrasive environment in which the implement typically operates. The problems resulting from this wear can be reduced through the use of wear parts or shrouds designed to shield the leading edge, but provision must be made for securing such shrouds to the implement in a manner that reliably fastens them during operation yet allows for their easy removal and replacement when they become worn. Such shrouds are required to have high resistance to impact and to abrasion wear and are made of steel alloys which provide these properties. However such materials are not compatible with normal weld procedures and therefore the shrouds cannot be welded directly to the implement, e.g. a bucket lip. Mechanical fastening systems involving the provisions of holes through the bucket lip are undesirable because of the weakening effect of such holes. Accordingly it is known to provide a mounting system incorporating a mounting block or boss of a weldable steel which is welded to the bucket lip and to provide a mechanical attachment means for anchoring the shroud to the block. Examples of such wear protection systems can be seen in U.S. Pat. No. 5,088,214 Jones and U.S. Pat. No. 4,748,754 Schwappach.

The present invention provides a wear protector system for shielding from wear a portion of a leading edge of an earthmoving implement, said system including; an anchor for fixed welded attachment to a surface of said implement at a predetermined location rearwardly of said leading edge, said anchor comprising a block having a bottom surface for attachment to said implement surface, an undercut transverse forward first abutment surface, and an upper surface; and a shroud having a U-shaped nose and a rearwardly extending tail, said tail defining a transverse rearwardly facing second abutment surface that is complementary to said first abutment surface, said anchor and said shroud being configured to interengage when said anchor is fixed to the implement at said location such that the nose of the shroud lies against and extends around said leading edge; said anchor and said shroud having respective complementary channels, which, when said anchor and shroud are interengaged, together define a transverse passageway through which a tapered cotter pin can be inserted to retain said shroud in engagement with said anchor and with the leading edge of the implement. The complementary channels are mutually offset in the front-to-rear direction so that the cotter pin when engaged will urge the shroud rearwardly with a wedging action.

The first abutment surface is preferably undercut by being inclined rearwardly from top-to-bottom, the mating abutment surface on the shroud being similarly inclined, this undercut configuration being effective to prevent the tail of the shroud rising out of contact with the anchor. Additional pairs of abutment surfaces may be provided to reinforce this effect, and preferably each abutment surface comprises a pair of facets that are angled to opposite sides forwardly or rearwardly with respect of the transverse direction to provide a centering effect of the shroud relative to the anchor.

The profile of the cotter pin is preferably tapered along its length so that it can be driven in to the transverse passageway to varying degrees, and thus the arrangement, together with the offset in the channels of the shroud and the anchor, is capable of taking up any clearance that may arise in the mounting system as a result of wear during extended periods of service. Preferably the passageway is tapered from opposite sides towards its central area so that the cotter pin can be driven in from either side. To prevent accidental dislodgement of the cotter pin, preferably it is of a length sufficient that its leading end extends completely through the passageway and can be swaged over, this deformation preventing accidental withdrawal.

BRIEF DESCRIPTION OF THE DRAWINGS

The invention will further be described, by way of example only, with reference to the accompanying drawings wherein.

BRIEF DESCRIPTION OF THE PREFERRED EMBODIMENT

Figure 1:
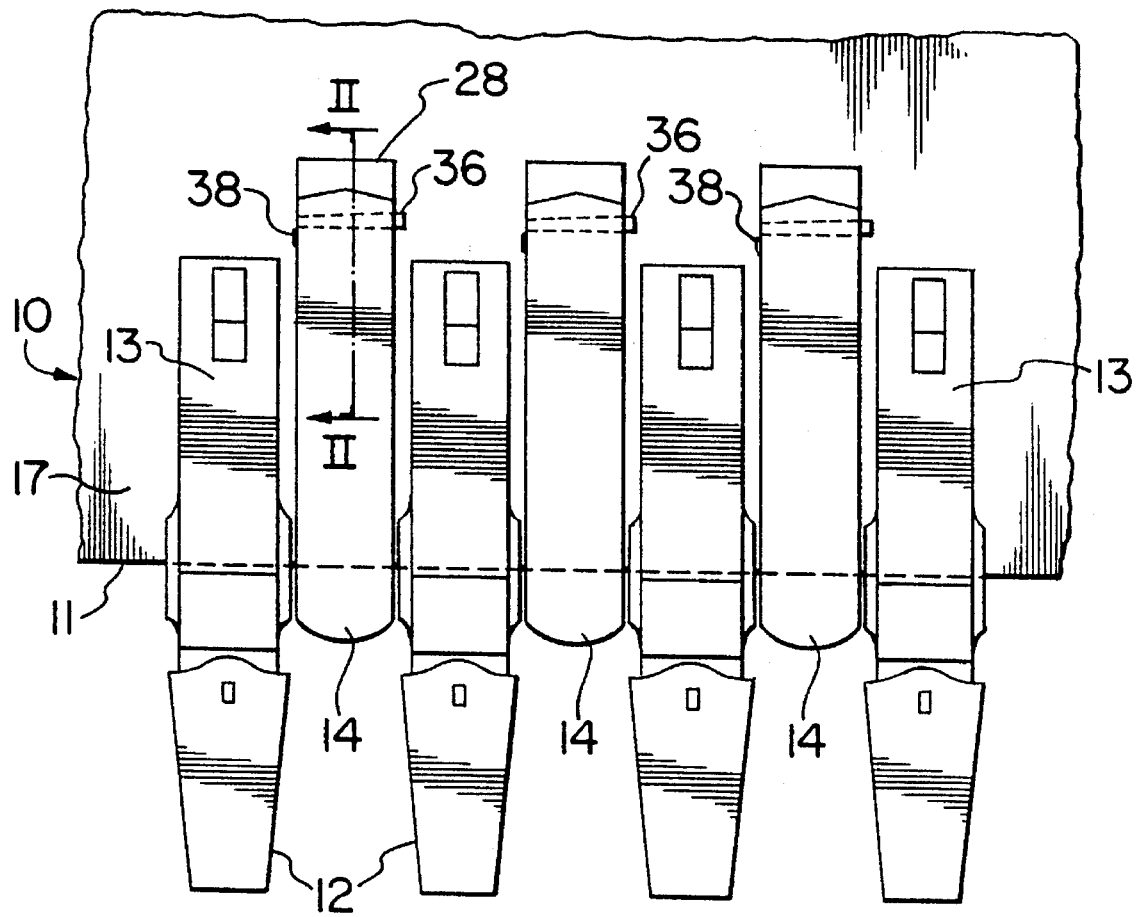
FIG. 1 is a fragmentary plan view showing a portion of the lip region of a bucket of an earthmoving implement.

Referring to FIG. 1, the bucket 10 of an earthmoving machine has a leading edge 11 along which are spaced a series of digger teeth 12 projecting forwardly of the leading edge at regular intervals, each tooth being mounted on an adaptor 13 which in turn is secured to the bucket lip in known manner. The regions of the bucket lip between the teeth require protection since they would otherwise be subjected to rapid wear because of the abrasive environment of operation, and for this purpose in each position a shroud 14 is provided.

Figure 2:
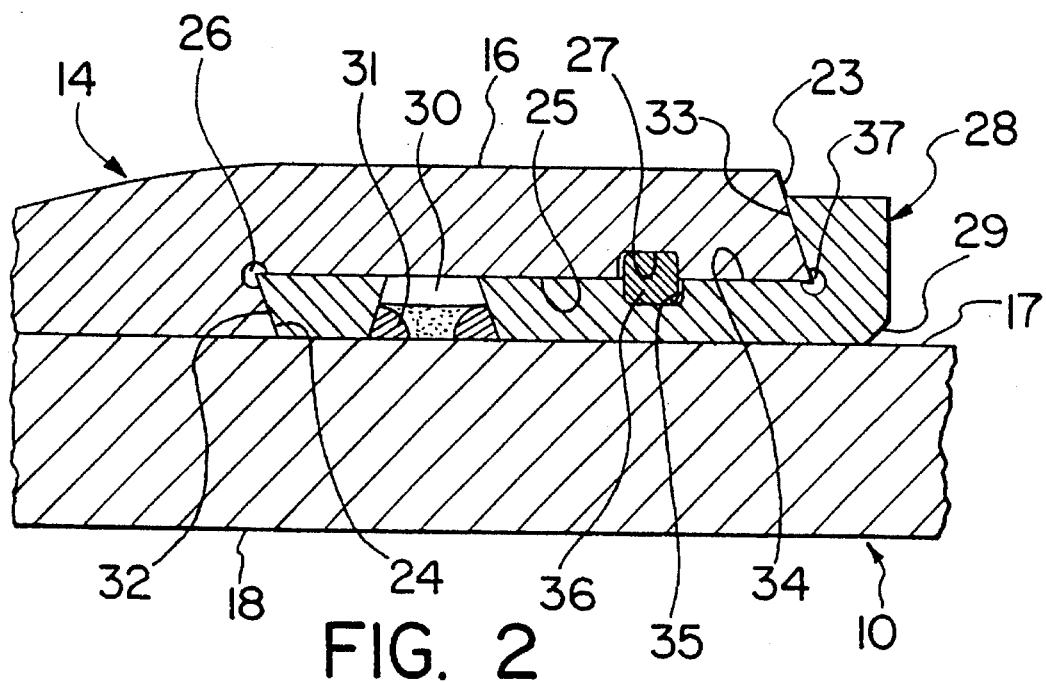
FIG. 2 is an enlarged fragmentary sectional view taken on the line 2—2 in FIG. 1.
Figure 3:
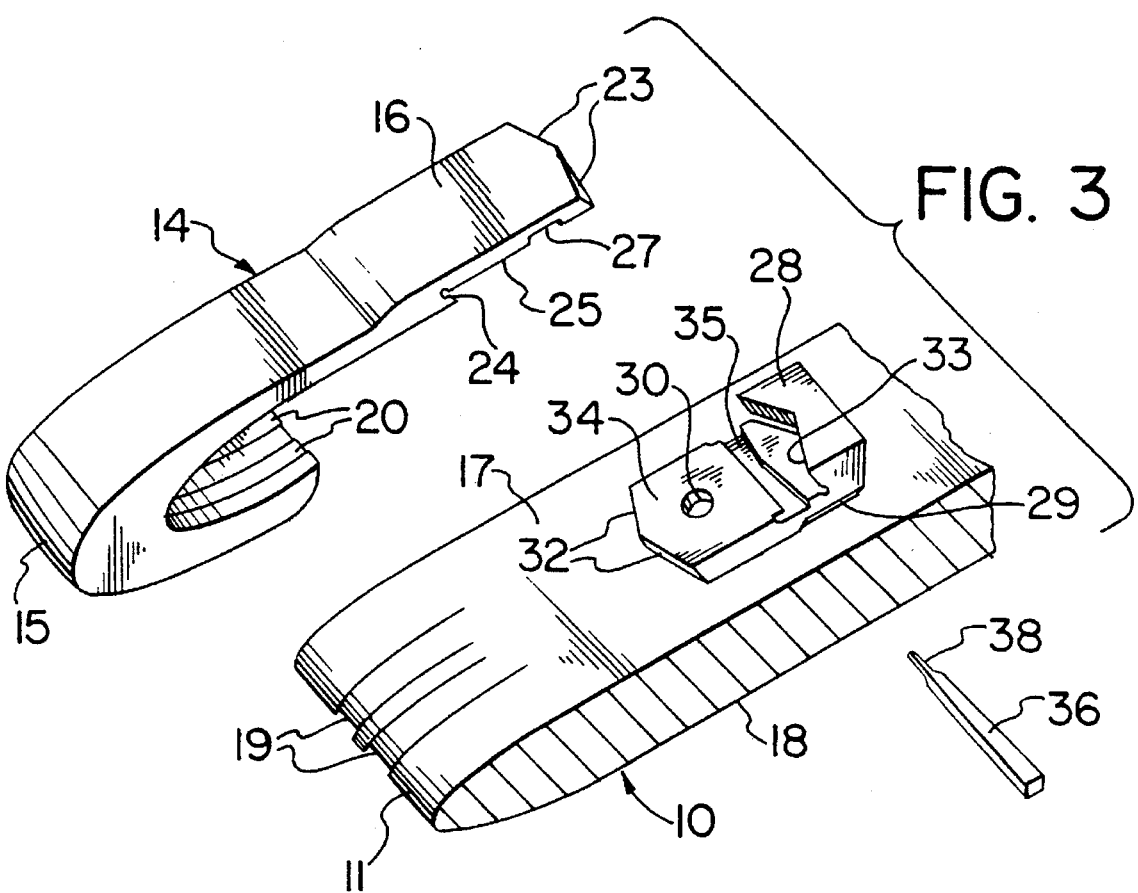
FIG. 3 is an exploded view showing portions of the wear pro or system.

The configuration of the shroud 14 is seen more clearly in FIGS. 2 and 3 and comprises a curved nose portion 15 and a rearwardly extending tail portion 16, the shroud being of substantially uniform width throughout its length. As seen in FIGS. 1 and 3, the nose 15 of the shroud is configured to lie in contact with the leading edge 11 and to shield the upper and lower surfaces 17, 18 of the bucket in the vicinity of the leading edge. As seen in FIG. 3 the leading edge portion of the bucket is formed with a pair of shallow grooves 19 extending therearound, the inner sides of the nose 15 being formed with a pair of ribs 22 that are sized to fit into the grooves 19.

The tail 16 of the shroud has a rear end that is formed by two angled facets 23 which together have a wide angle V-shape configuration and which are angled slightly rearwardly from top-to-bottom.

The underside of the tail 16 is recessed from the rear end forwardly to a front pair of rearwardly directed facets 24 which are likewise rearwardly inclined downwardly, and which together define a forwardly directed Wide V-configuration.

Between the rear facets 23 and the front facets 24, the underside of the tail is formed by a generally flat horizontal surface 25. The acute angle corner region between the facets 24 and the surface 25 is enlarged by a parallel bore 26 designed to prevent debris from accumulating in this corner.

A transverse groove 27 opens upwardly from the surface 25 and extends horizontally across the tail. This groove is of generally rectangular profile and tapers in width more or less uniformly from its opposite ends towards the center.

An anchor block 28 has a chamfered undercut 29 extending across its lower edge at the rear and part way forwardly along both sides, and may be affixed to the surface 17 of the bucket by a weld bead applied along the length of this chamfer. In the forward portion of the block 28 there is a vertical through hole 30 through which a weld bead 31 may be applied to further attach the anchor to the surface 17.

Figure 4:
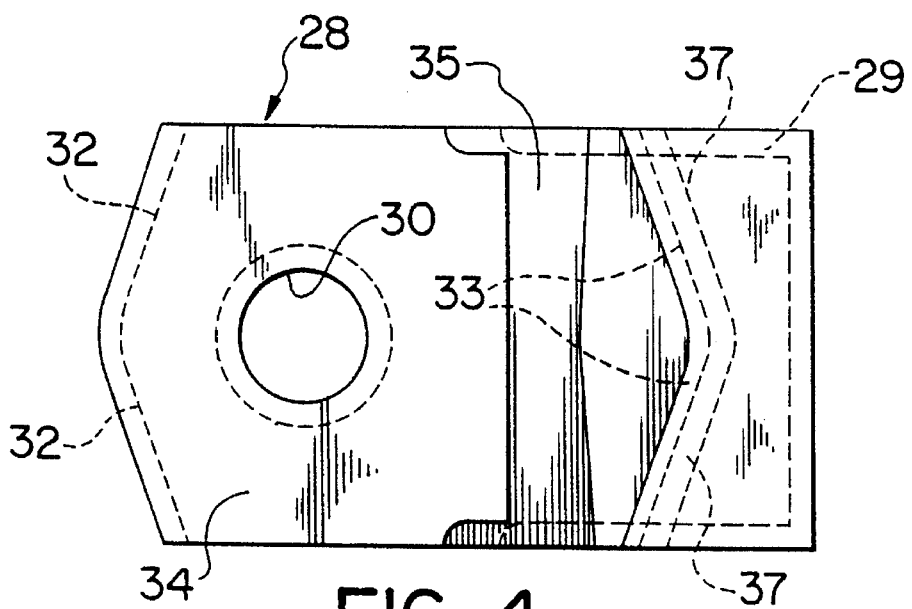
FIG. 4 is a plan view of an anchor block which forms part of the system

The configuration of the anchor 28 is complementary to that of the tail 16 of the shroud and is shown most clearly in FIG. 4. Thus the forward part of the anchor has a V-shaped configuration formed by two angled facets 32 which are inclined slightly rearwardly from top-to-bottom. A rear pair of angled facets 33 are likewise angled rearwardly from top-to-bottom and are arranged in a rearwardly pointing V-shape configuration. Between the pairs of facets 32 and 33 the anchor 28 has a horizontal top surface 34 from which opens a transverse channel 35 of generally rectangular profile, the channel tapering in width from its opposite ends towards its central region, as clearly seen in FIG. 3.

In the assembled position, with the anchor block 28 welded to the upper surface 17 of the bucket 10 at a predetermined location and spacing rearwardly from the lip 11, the shroud 14 can be positioned over the lip 11 as indicated in FIG. 1 and in intimate contact therewith, in which position the shroud tail portion 16 interengages with the anchor block 28 as is clearly shown in FIG. 2. In this interengaged position the complementary facet pairs 24, 32 and 23, 33 of the shroud and anchor block respectively are in intimate abutting contact. In this configuration the rectangular grooves 27 and 35 are in confronting relationship and provide a through passage extending transversely between the shroud and the anchor block. As seen in FIG. 1, this passage is located rearwardly of the tooth adaptors 13, and accordingly is accessible for the insertion of a tapered cotter pin 36 into the passageway from either end.

As will be clear from FIG. 2, in the engaged position of the shroud 14 on the anchor block 18, the confronting grooves 27, 35 are not in precise register, but rather are relatively offset in the front-to-rear direction of the shroud: specifically the shroud groove 27 is forwardly offset with respect to the anchor groove 35. In the engaged position a tapered cotter pin 35 can be inserted into the passageway defined by the confronting grooves 27, 35 and driven into wedging engagement therewith. As seen in FIG. 2, the upper part of the pin engages against the rear side of the shroud groove 27 and the lower part of the pin engages against the front side of the anchor groove 35 so that driving insertion of the cotter pin 36 has the effect of pressing the shroud rearwardly and the confronting pairs of facets, and likewise the nose 15 of the shroud and the leading edge 11 of the bucket, into intimate engagement. The compressive forces caused by the wedge between the shroud and, the anchor block also act on the undercut complementary abutment surfaces in combination with the anchor and lip surface to produce a compressive joint. Thus, even should some degree of wear occur between these confronting facets, this can be taken up through the wedging action created by the cotter pin 36. The bores 26, and similar bores 37 between the facets 33 and the horizontal surface 34 of the anchor 28, allows for the escape of debris which otherwise might impair the intimate engagement of the confronting facets.

Once the cotter pin 36 has been fully inserted, its thin nose portion 38 can be swaged over to lie against the sides of the shroud 14 and anchor block 28 (these being of the same width) to prevent inadvertent loosening and withdrawal of the cotter pin. In the engaged position it will be evident that the shroud is securely held in contact with the region of the bucket surrounding the leading edge 11. The cotter pin 36 prevents forward movement of the shroud 14 relative to the anchor 28, whereas the undercut configuration of the confronting facets maintains the tail portion 16 of the shroud against any tendency towards upwards displacement.

The pairs of angled abutment facets provide large bearing areas for absorbing thrust forces between the shroud and the anchor providing a means for transmitting shock and other loads from the shroud to the lip portion of the bucket 10. The forward or rearward lateral inclination of these facets also provides lateral stabilization of the shroud 14 relative to the bucket 10 without the need for additional locks or secondary engagement surfaces. This lateral stabilization is enhanced by the rib/groove 20, 19 interengagement between the nose of the shroud and the leading edge region of the bucket. The large areas of the interengaging facets have the effect of reducing compressive stress loads which in turn should reduce possible deformation and wear. However if wear does occur, the mounting arrangement allows for intermittent adjustment since such wear can be taken up simply by driving the cotter pin 36 further into its passageway.

What I claim as my invention is:

1. A wear protector system for shielding from wear a portion of a leading edge of an earthmoving implement, said system including:

an anchor for fixed welded attachment to a surface of said implement at a predetermined location rearwardly of said leading edge, said anchor comprising a block having a bottom surface for attachment to said implement surface, an undercut transverse forward first abutment surface, and an upper surface; and a shroud having a U-shaped nose and a rearwardly extending tail, said tail defining a transverse rearwardly facing second abutment surface that is complementary to said first abutment surface, said anchor and said shroud being configured to interengage when said anchor is fixed to the implement at said location such that the nose of the shroud lies against and extends around said leading edge;

said anchor and said shroud having respective complementary channels, which, when said anchor and shroud are interengaged, together define a transverse passageway; through which a tapered cotter pin can be inserted to retain said shroud in engagement with said anchor and with the leading edge of the implement.

2. A wear protector system as claimed in claim 1 wherein said complementary channels are mutually offset in the front-to-rear direction such that said cotter pin upon insertion in said passageway acts between a forwardly facing rear surface of the shroud channel and a rearwardly facing front surface of the anchor channel producing compressive forces acting to urge said shroud rearwardly into engagement with said leading edge and to urge said second abutment surface thereof into engagement with said first abutment surface on said anchor.

3. A wear protector system as claimed in claim 1 wherein said first abutment surface is undercut by being inclined rearwardly from top to bottom, said second abutment surface being inclined in complementary manner.

4. A wear protector as claimed in claim 1 wherein said passageway is defined between an upwardly facing horizontal surface on said anchor and a corresponding downwardly facing surface on said shroud.

5. A wear protector system as claimed in claim 2 wherein each of said first and second abutment surfaces comprise two sections, each said section being angled to said transverse direction.

6. A wear protector system as claimed in claim 1 including a second pair of undercut complementary abutment surfaces formed respectively on said anchor and on said shroud.

7. A wear protector system as claimed in claim 1 wherein said anchor defines a through hole extending from the top to the bottom thereof, the bottom edge of said hole providing a location for forming a weld attachment between said anchor and said surface of the implement.

8. A wear protector system as claimed in claim 1 wherein said passageway tapers along the length thereof.

9. A wear protector system as claimed in claim 8 wherein said passageway tapers from its opposite ends towards the middle thereof.

10. A wear protector system as claimed in claim 1 wherein said nose of the shroud has a concave inner surface for engagement with the leading edge region of the implement, said concave surface having a configuration of ribs and grooves that extend longitudinally thereon in a plane perpendicular to said leading edge and designed for interengagement with a complementary rib and groove configuration in the vicinity of the leading edge so as to provide lateral stability to the shroud when installed.

* * * * *